(12) United States Patent
Kanamori

(10) Patent No.: US 8,193,284 B2
(45) Date of Patent: Jun. 5, 2012

(54) PROCESS FOR PRODUCING POLYOLEFIN RESIN COMPOSITION

(75) Inventor: Kazunori Kanamori, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 7 days.

(21) Appl. No.: 12/670,665

(22) PCT Filed: Jul. 24, 2008

(86) PCT No.: PCT/JP2008/063287
§ 371 (c)(1),
(2), (4) Date: Apr. 26, 2010

(87) PCT Pub. No.: WO2009/014178
PCT Pub. Date: Jan. 29, 2009

(65) Prior Publication Data
US 2011/0184122 A1    Jul. 28, 2011

(30) Foreign Application Priority Data
Jul. 26, 2007    (JP) ................................. 2007-194659

(51) Int. Cl.
*C08J 3/00*    (2006.01)
(52) U.S. Cl. ..................................................... 525/198
(58) Field of Classification Search ............. 525/198
See application file for complete search history.

(56) References Cited

U.S. PATENT DOCUMENTS 4,438,238 A * 3/1984 Fukushima et al. .......... 525/240
5,730,885 A   3/1998 Blakeslee et al.

FOREIGN PATENT DOCUMENTS

| JP | 9038423 A | 2/1997 |
| JP | 10158411 A | 6/1998 |
| JP | 2000511967 T | 9/2000 |
| JP | 2001059028 A | 3/2001 |
| JP | 2004027212 A | 1/2004 |
| JP | 2006088081 | 4/2006 |
| JP | 2006213917 A | 8/2006 |

* cited by examiner

*Primary Examiner* — Nathan M Nutter
(74) *Attorney, Agent, or Firm* — Panitch Schwarze Belisario & Nadel LLP

(57) ABSTRACT

The process for producing a polyolefin resin composition according to the present invention has a mixing step of melt-kneading a plurality of polyolefin ingredients having intrinsic viscosities different from each other to prepare a mixed fluid; and a filtering step of introducing the mixed fluid into a filter device having a main body section having a flow passage through which the mixed fluid is transferred and a sintered metal filter disposed in the flow passage of the main body section of the device and forcing the mixed fluid to pass through the sintered metal filter so that the filtration rate of the mixed fluid will be in a prescribed range. The sintered metal filter is fixed to the main body section of the device while keeping a section where the edge of the sintered metal filter abuts with the main body section of the device hermetically sealed in the above filter device.

6 Claims, 10 Drawing Sheets

(a)

(b)

PROCESS FOR PRODUCING POLYOLEFIN RESIN COMPOSITION

CROSS-REFERENCE TO RELATED APPLICATION

This application is a section 371 of International Application No. PCT/JP2008/063287, filed Jul. 24, 2008, which was published in the Japanese language on Jan. 29, 2009 under International Publication No. WO 2009/014178 A1 and the disclosure of which is incorporated herein by reference.

TECHNICAL FIELD

The present invention relates to a process for producing a polyolefin resin composition.

BACKGROUND ART

Polyolefin resin compositions are excellent in a variety of performances such as mechanical strength, heat seal performance, chemical resistance and food hygienic properties, and therefore they are widely used as materials of polymer films, and so on. In recent years, these polyolefin resin compositions have begun to be used for packaging of more expensive contents and for members of expensive industrial products, so that demand for their quality has become severer than before.

If contaminants such as gel-like carbonized polymers or dust are contained in a polyolefin resin composition, a circular defect, which is called a "fisheye" because of its similarity to the shape of a fisheye, is caused on the surface of a molded film of the polyolefin resin composition, which results in deterioration in appearance.

On account of this, as a method for removing contaminants from a polyolefin resin composition, methods in which the composition is filtered through a metal mesh, sintered metal filters such as a metal fiber sintered body and a metallic powder sintered body are known (see, for example, Patent Documents 1, 2).

A filter excellent in filtration accuracy is usually used in the filtration method mentioned above so as to sufficiently reduce the occurrence of fisheyes. When such a filter is used, however, excessive load is imposed on an extruder and therefore productivity deteriorates. Accordingly, a filtration method using a leaf disk type filter in which the filtration area is large enough but does not cause the filter facilities to become excessively large is proposed (see, for example, Patent Document 1).

In addition, demand for various physical properties and workability of a polyolefin resin composition to be achieved at high levels has increased with the diversification of the product thereof. Polyolefin resin compositions containing a plurality of polyolefin ingredients are being examined in order to meet such demand. Since fisheye due to poor dispersion of respective ingredients is liable to occur in such a polyolefin resin composition, technique to use various kinds of filters is proposed (see, for example, Patent Document 3).

Patent Document 1: Japanese Patent Laid-Open No. 2006-88081
Patent Document 2: Japanese Patent Laid-Open No. 09-38423
Patent Document 3: National Publication of International Patent Application No. 2000-511967

DISCLOSURE OF THE INVENTION

Problem to be Solved by the Invention

However, in the production of a polyolefin resin composition containing a plurality of polyolefin ingredients mentioned above, although contaminants can be sufficiently removed, fisheyes caused by poor dispersion cannot be sufficiently reduced. On account of this, a polyolefin film which comprises a plurality of polyolefin ingredients and in which fisheyes are sufficiently reduced as well as a polyolefin resin composition which can form such a polyolefin film are called for.

The present invention was made in consideration of the above problems and an object thereof is to provide a process for efficiently producing a polyolefin resin composition in which dispersion of respective polyolefin ingredients is sufficiently good and homogeneous.

Means for Solving the Problem

In order to achieve the above object, the present invention provides a process for producing a polyolefin resin composition comprising a mixing step of melt-kneading a raw material composition which contains polyolefin ingredients having intrinsic viscosities different from each other to prepare a mixed fluid; and a filtering step of forcing the mixed fluid to pass through a sintered metal filter so that the filtration rate of the mixed fluid will be in a prescribed range.

The above filtering step is a step comprising introducing a mixed fluid into a filter device having a main body section having a flow passage through which the mixed fluid is transferred and a sintered metal filter disposed in the flow passage of the main body section of the device and forcing the mixed fluid to pass through the sintered metal filter. The sintered metal filter is fixed to the main body section of the device while keeping a section where the edge of the sintered metal filter abuts with the main body section of the device hermetically sealed. On account of this, it is possible to sufficiently inhibit the mixed fluid from leaking to the downstream side through the edge of the sintered metal filter while failing to pass through the sintered metal filter.

In the polyolefin resin composition obtained by this production process, the dispersion of polyolefin ingredients having different intrinsic viscosities is sufficiently good. The reason why such an effect is provided is not necessarily clear, but the present inventors suppose as follows. An increase in the filtration pressure beyond the allowable pressure of the filter device is prevented and deformation of openings and/or expansion of openings in the sintered metal filter are controlled by setting a suitable filtration rate in accordance with the filtration accuracy of the sintered metal filter or the intrinsic viscosity of the mixed fluid. As a result, flowing of aggregates of a high viscosity polyolefin ingredient among the plurality of polyolefin ingredients to the downstream side of the sintered metal filter can be suppressed. It is considered that this causes the aggregates of the high viscosity polyolefin ingredient to disperse during filtration and consequently a polyolefin resin composition in which dispersion of the respective polyolefin ingredients is good and homogeneous can be obtained.

More specifically, the process for producing a polyolefin resin composition according to the present invention has the following first to third aspects.

The first aspect of the present invention is a process for producing a polyolefin resin composition containing a polyolefin ingredient (A) having an intrinsic viscosity $[\eta]_A$ of 3 to 5 dl/g and a polyolefin ingredient (B) having an intrinsic viscosity $[\eta]_B$ of 0.5 to 3 dl/g with a ratio of intrinsic viscosity $[\eta]_A$ to intrinsic viscosity $[\eta]_B$ ($[\eta]_A/[\eta]_B$) being in a range of 1.5 to 30, wherein the process comprises:

a mixing step comprising melt-kneading a raw material composition which contains the polyolefin ingredient (A) and the polyolefin ingredient (B) to prepare a mixed fluid having a content of polyolefin ingredient (A) of 0.05 to 35 mass % and a content of polyolefin ingredient (B) of 99.5 to 65 mass % based on the total mass of the raw material composition; and a filtering step comprising introducing the mixed fluid into a filter device having a main body section having a flow passage through which the mixed fluid is transferred and a sintered metal filter having a filtration accuracy of 1 to 40 μm and disposed in the flow passage of the main body section of the device and forcing the mixed fluid to pass through the sintered metal filter so that the filtration rate of the mixed fluid will be 0.001 to 20 cm/min, wherein the sintered metal filter is fixed to the main body section of the device while keeping a section where the edge of the sintered metal filter abuts with the main body section of the device hermetically sealed.

The second aspect of the present invention is a process for producing a polyolefin resin composition containing a polyolefin ingredient (A) having an intrinsic viscosity $[\eta]_A$ of 3 to 5 dl/g and a polyolefin ingredient (B) having an intrinsic viscosity $[\eta]_B$ of 0.5 to 3 dl/g with a ratio of intrinsic viscosity $[\eta]_A$ to intrinsic viscosity $[\eta]_B$ ($[\eta]_A/[\eta]_A$) being in a range of 1.5 to 30, wherein the process comprises:

a mixing step comprising melt-kneading a raw material composition which contains the polyolefin ingredient (A) and the polyolefin ingredient (B) to prepare a mixed fluid having a content of polyolefin ingredient (A) of 0.05 to 35 mass % and a content of polyolefin ingredient (B) of 99.5 to 65 mass % based on the total mass of the raw material composition; and a filtering step comprising introducing the mixed fluid into a filter device having a main body section having a flow passage through which the mixed fluid is transferred and a sintered metal filter having a filtration accuracy of 1 to 20 μm and disposed in the flow passage of the main body section of the device and forcing the mixed fluid to pass through the sintered metal filter so that the filtration rate of the mixed fluid will be 0.001 to 100 cm/min, wherein the sintered metal filter is fixed to the main body section of the device while keeping a section where the edge of the sintered metal filter abuts with the main body section of the device hermetically sealed.

The third aspect of the present invention is a process for producing a polyolefin resin composition containing a polyolefin ingredient (A) having an intrinsic viscosity $[\eta]_A$ of 5 to 15 dl/g and a polyolefin ingredient (B) having an intrinsic viscosity $[\eta]_B$ of 0.5 to 3 dl/g, wherein the process comprises:

a mixing step comprising melt-kneading a raw material composition which contains the polyolefin ingredient (A) and the polyolefin ingredient (B) to prepare a mixed fluid having a content of polyolefin ingredient (A) of 0.05 to 35 mass % and a content of polyolefin ingredient (B) of 99.5 to 65 mass % based on the total mass of the raw material composition; and a filtering step comprising introducing the mixed fluid into a filter device having a main body section having a flow passage through which the mixed fluid is transferred and a sintered metal filter having a filtration accuracy of 1 to 10 μm and disposed in the flow passage of the main body section of the device and forcing the mixed fluid to pass through the sintered metal filter so that the filtration rate of the mixed fluid will be 0.001 to 0.2 cm/min, wherein the sintered metal filter is fixed to the main body section of the device while keeping a section where the edge of the sintered metal filter abuts with the main body section of the device hermetically sealed.

It is preferable that the mixed fluid be forced to pass through a sintered metal filter while being pressurized with an extruder in the above filtering step. In other words, it is preferable to conduct the filtering step by using a filter device having a sintered metal filter and an extruder that transfers the mixed fluid toward the filter device.

In addition, it is preferable to use a leaf disk type filter formed with a plurality of sintered metal filters as a filter device in the process for producing a polyolefin resin composition of the present invention. In this case, it is preferable that the filtration rate of the mixed fluid be 0.001 to 0.2 cm/min from a viewpoint of preventing leaking due to the deformation of the leaf disk type filter. A polyolefin resin composition in which dispersion of the respective polyolefin ingredients is good and homogeneous can be obtained by adopting such a constitution.

It is preferable that the polyolefin resin composition contain a polypropylene polymer. Since polypropylene involves a small amount of gel-like contaminants resulting from heat deterioration, a still more uniform polyolefin resin composition can be obtained.

It is preferable that the raw material composition used in the first and second aspects of the present invention be one obtained by a polymerization process comprising a step of producing a polyolefin ingredient (A) having an intrinsic viscosity of not less than 3 dl/g and a step of continuously producing a polyolefin ingredient (B) having an intrinsic viscosity of less than 3 dl/g. In the meantime, it is preferable that the raw material composition used in the mixing step of the third aspect of the present invention be one obtained by a polymerization process comprising a step of producing a polyolefin ingredient (A) having an intrinsic viscosity of not less than 5 dl/g and a step of continuously producing a polyolefin ingredient (B) having a an intrinsic of less than 3 dl/g. In addition, it is preferable that the intrinsic viscosity of the whole raw material composition used in the first through third aspects be less than 3 dl/g. A polyolefin resin composition in which respective polyolefin ingredients are dispersed sufficiently uniformly to a minute level can be obtained by using such a raw material composition containing a plurality of polyolefin ingredients as described above.

The dispersion of respective polyolefin ingredients is sufficiently good and homogeneous in the polyolefin resin composition produced by the production process having the above characteristics. Therefore, a polyolefin film in which fisheyes are sufficiently reduced can be produced by shaping this polyolefin resin composition into a film.

Effect of the Invention

According to the present invention, a process for efficiently producing a polyolefin resin composition in which the dispersion of respective polyolefin ingredients is sufficiently good and homogeneous can be provided.

Figure 1:
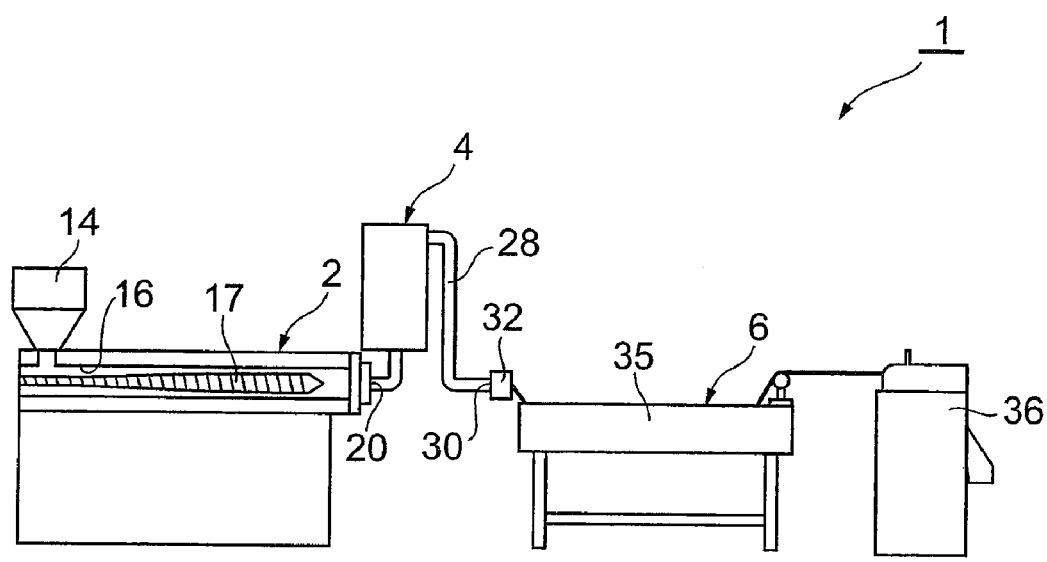
FIG. 1 is a schematic diagram of a production device used for the process for producing a polyolefin resin composition according to one embodiment of the present invention.

EXPLANATIONS OF NUMERALS 1, 60, 70 . . . production device, 2 . . . extruder, 2a . . . flange, 2b . . . bolt, 4, 34 . . . filter device, 6 . . . molding equipment, 14 . . . hopper, 15 . . . motor, 16 . . . barrel, 17 . . . screw, 20, 30 . . . connecting part, 26, 28 . . . pipe, 22 . . . filter housing, 24 . . . leaf disk type filter, 24a, 53, . . . sintered metal filter, 24b . . . supporting member, 24c . . . edge of leaf disk type filter, 25 . . . tubular member, 32, 46 . . . die, 35 . . . water tank, 36 . . . pelletizer, 40 . . . screen pack, 44 . . . chill-roll, 45 . . . air chamber device, 50 . . . laminate, 54a, 54b, 54c . . . wire netting, 55 . . . breaker plate, 55a . . . edge of breaker plate, 55d . . . opening, 55e . . . side of breaker plate, 58 . . . seal member, F1, F2 . . . surface of breaker plate

BEST MODES FOR CARRYING OUT THE INVENTION

Hereinbelow, preferable embodiments of the present invention will be described referring to the drawings as needed. In the description of the drawings, the same referential numerals or symbols are used for the same or equivalent elements and repeated description is omitted.

<First Embodiment>

A process for producing a polyolefin resin composition according to this embodiment has a mixing step of melt-kneading a raw material composition which contains a plurality of polyolefin ingredients having intrinsic viscosities different from each other to prepare a mixed fluid; and a filtering step of forcing the mixed fluid through to pass a sintered metal filter at a prescribed filtration rate by extruding the mixed fluid to the sintered metal filter.

FIG. 1 is a schematic diagram of a production device used for the process for producing a polyolefin resin composition according to an embodiment of the present invention. The production device 1 has an extruder 2, a filter device 4 disposed on the downstream side of the extruder 2 and a molding equipment 6 disposed on the downstream side of the filter device 4.

The extruder 2 is a device for melt-kneading a raw material composition and has, on the upstream side, a hopper 14 to which a raw material composition which contains a plurality of polyolefin ingredients having intrinsic viscosities different from each other is fed and a cylindrical barrel 16 having one or more screw(s) 17 therein on the downstream side of the hopper 14. A commercially available single screw extruder, co-rotating twin screw extruder, counter-rotating twin screw extruder, etc. can be used as the extruder 2. Examples of a co-rotating twin screw extruder include TEM (registered trademark) produced by Toshiba Machine Co., Ltd., TEX (registered trademark), and CMP (registered trademark) produced by Japan Steel Works, Ltd. and, examples of a counter-rotating twin screw extruder include FCM (registered trademark), NCM (registered trademark), and LCM (registered trademark) produced by Kobe Steel, Ltd.

In the mixing step, a raw material composition containing a plurality of polyolefin ingredients is supplied from the hopper 14 to the extruder 2 and melt-kneaded therein. The raw material composition used here contains a plurality of polyolefin ingredients having intrinsic viscosities different from each other.

As a raw material composition, a plurality of polyolefin ingredients having intrinsic viscosities different from each other may be provided and used in combination or polyolefin obtained by polymerizing an olefin ingredient to produce a polyolefin and then producing a polyolefin having a different intrinsic viscosity in succession may be used. The polyolefin contains a plurality of polyolefin ingredients having intrinsic viscosities different from each other. In this embodiment, a raw material composition containing a plurality of polyolefin ingredients having intrinsic viscosities different from each other which are directly polymerized by multistage polymerization is preferably used.

As a process for producing a raw material composition, for example, a batch polymerization method in which a polyolefin is produced in a polymerization tank (first step) and, subsequently after that, a polyolefin having a different intrinsic viscosity is produced in the same polymerization tank (second step) is included. As another production process, a continuous polymerization method in which two or more polymerization tanks are disposed in series and after polyolefin is produced (first step), the obtained polymer is transferred to the next polymerization tank, where a polyolefin having a different intrinsic viscosity is produced (second step) is included. Here, the number of the polymerization tanks respectively used in the first step and the second step may be one or two or more in the case of continuous polymerization method.

Examples of the polyolefin include a propylene homopolymer, a propylene-ethylene random copolymer, a propylene-ethylene-α-olefin terpolymer, a propylene-α-olefin copolymer, a propylene-ethylene-block copolymer, a high density polyethylene, a low density polyethylene, an ethylene-α-olefin copolymer and butene-1 copolymer. Of these, a propylene homopolymer, a propylene-ethylene random copolymer, a propylene-ethylene-α-olefin terpolymer and a propylene-ethylene-block copolymer are preferable.

As the α-olefin used for the propylene-α-olefin copolymer, the propylene-ethylene-α-olefin terpolymer and the ethylene-α-olefin copolymer, α-olefins having 4 to 12 carbon atoms are included, and examples thereof include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene. Of these, 1-butene, 1-pentene, 1-hexene and 1-octene are preferable, and 1-butene and 1-hexene are more preferable from the viewpoint of copolymerization property and economic efficiency.

When a propylene-ethylene copolymer is used as polyolefin, the ethylene content of the copolymer is typically 0.1 to 20 mass %, and preferably 0.5 to 10 mass %. When a propylene-α-olefin copolymer is used, the content of the α-olefin of the copolymer is typically 0.1 to 40 mass %, and preferably 1 to 30 mass %. When a propylene-ethylene-α-olefin terpolymer is used, the ethylene content of the copolymer is typically 0.1 to 20 mass %, and preferably 0.5 to 10 mass %, and the α-olefin content is typically 0.1 to 40 mass %, and preferably 1 to 30 mass %. When ethylene-α-olefin copolymer is used, the content of the α-olefin of the copolymer is typically 0.1 to 30 mass %, and preferably 1 to 20 mass %.

Examples of the polymerization method of olefin include a solvent polymerization method with an inert hydrocarbon solvent, a bulk polymerization method using a liquid monomer as a solvent, and a vapor phase polymerization method performed in gaseous monomers. As a method to obtain a raw material composition containing a plurality of polyolefin ingredients having intrinsic viscosities different from each other directly by polymerization, a batch polymerization method performed in batches, a vapor phase-vapor phase polymerization method and a liquid phase-vapor phase polymerization method performed continuously are included, and among these, a vapor phase-vapor phase polymerization method and a liquid phase-vapor phase polymerization method performed continuously are preferable from the viewpoint of productivity.

The above polyolefin can be obtained using, for example, a Ti—Mg type catalyst comprising a solid catalyst ingredient in which a magnesium compound is complexed with a Ti compound, a catalyst system in which an organoaluminum compound and a third ingredient such as an electron-donating compound as required are combined with this solid catalyst ingredient or a metallocene catalyst. More specifically, catalyst systems described in Japanese Patent Laid-Open No. 61-218606, Japanese Patent Laid-Open No. 61-287904 and Japanese Patent Laid-Open No. 07-216017 are included.

In this embodiment, it is preferable to use a raw material composition containing a polyolefin ingredient (A) having an intrinsic viscosity of 5 to 15 dl/g and a polyolefin ingredient (B) having an intrinsic viscosity of 0.5 to 3 dl/g. In addition, it is more preferable that the viscosity ratio ($[\eta]_A/[\eta]_B$) of the polyolefin ingredient (A) to the polyolefin ingredient (B) be in a range of 1.5 to 30. This makes it possible to obtain a polyolefin resin composition in which occurrence of fisheye and occurrence of processing defects can be still more reduced.

When the polyolefin ingredient having the above-mentioned intrinsic viscosity is used, the content of the polyolefin ingredient (A) is 0.05 to 35 mass % based on the total amount of the polyolefin ingredients (A) and (B). Here, it is preferable that the intrinsic viscosity of the whole raw material composition be 1.0 to 3.0 dl/g from a viewpoint of obtaining a still more homogeneous polyolefin resin composition.

Additives such as antioxidants such as a phenolic antioxidant or a phosphorus antioxidant, neutralizing agents, lubricants, antistatic agents, anti-blocking agents, fluorinated resins and polyethylene resins may be incorporated into the raw material composition containing polyolefin ingredients in order to improve the performance of the produced polyolefin resin composition.

The addition method of the additives is not limited in particular as long as a homogeneous polyolefin resin composition can be obtained. For example, a method in which powder of the raw material composition and various additives are blended using mixing equipment such as a Henschel mixer and then the mixture is directly pelletized, a method in which an additive masterbatch having a relatively high concentration is pelletized using a high kneading extruder such as a twin screw extruder and then blended with the raw material composition, or a method in which additives are molten and added to the raw material composition in a liquid state can be adopted.

Examples of the phenolic antioxidant include 2,6-di-tert-butyl-4-methylphenol, tetrakis[methylene-3-(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, tris(3,5-di-tert-butyl-4-hydroxybenzyl)isocyanurate, triethylene glycol-N-bis-3-(3-tert-butyl-5-methyl-4-hydroxyphenyl) propionate, 1,6-hexanediol bis[3-(3,5-di-tert-butyl-4-hydroxyphenyl)propionate], 2,2-thiobis-diethylenebis[3-(3,5-di-tert-butyl-4-hydroxyphenyl)propionate], and α-tocopherols represented by vitamin E.

Examples of the phosphorus antioxidant include tris(nonylphenyl) phosphite, tris(2,4-di-tert-butylphenyl) phosphite, distearylpentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4-dicumylphenyl)pentaerythritol diphosphite, tetrakis(2,4-di-tert-butylphenyl)-4,4'-diphenylene diphosphite, 2,2'-methylenebis(4,6-di-tert-butylphenyl) 2-ethylhexylphosphite, 2,2'-ethylidenebis(4,6-di-tert-butylphenyl) fluorophosphite, bis(2,4-di-tert-butyl-6-methylphenyl) ethylphosphite, 2-(2,4,6-tri-tert-butylphenyl)-5-ethyl-5-butyl-1,3,2-oxaphosphorinane, 2,2',2''-nitrilo[triethyl-tris(3,3',5,5'-tetra-tert-butyl-1,1'-biphenyl-2,2'-diyl)]phosphite.

The neutralizing agent includes calcium stearate, magnesium stearate, hydrotalcite, and calcium hydroxide.

Examples of the lubricant include higher fatty acid amides and higher fatty acid esters. Examples of the antistatic agent include glycerine ester of a fatty acid having 8 to 22 carbon atoms, sorbitan acid esters and polyethylene glycol esters. Examples of the anti-blocking agent include silica, calcium carbonate and talc.

The raw material composition containing a plurality of polyolefin ingredients having different intrinsic viscosities is melt-kneaded while being transferred by the screw 17 inside a barrel 16 heated with a heater and becomes a mixed fluid. It is preferable that the heating temperature to obtain this mixed fluid be 160 to 300° C.

In the filtering step, the mixed fluid which has been processed in the extruder 2 is supplied to the filter device 4. Contaminants contained in the mixed fluid are removed by forcing the mixed fluid to pass through a sintered metal filter 24a of the filter device 4. In addition to this, polyolefin ingredients having intrinsic viscosities different from each other can be dispersed sufficiently and particularly, a polyolefin ingredient having a higher intrinsic viscosity can be highly dispersed in a polyolefin ingredient having a lower intrinsic viscosity. As a result, fisheyes caused by contaminants and poor dispersion can be reduced sufficiently.

Figure 2:
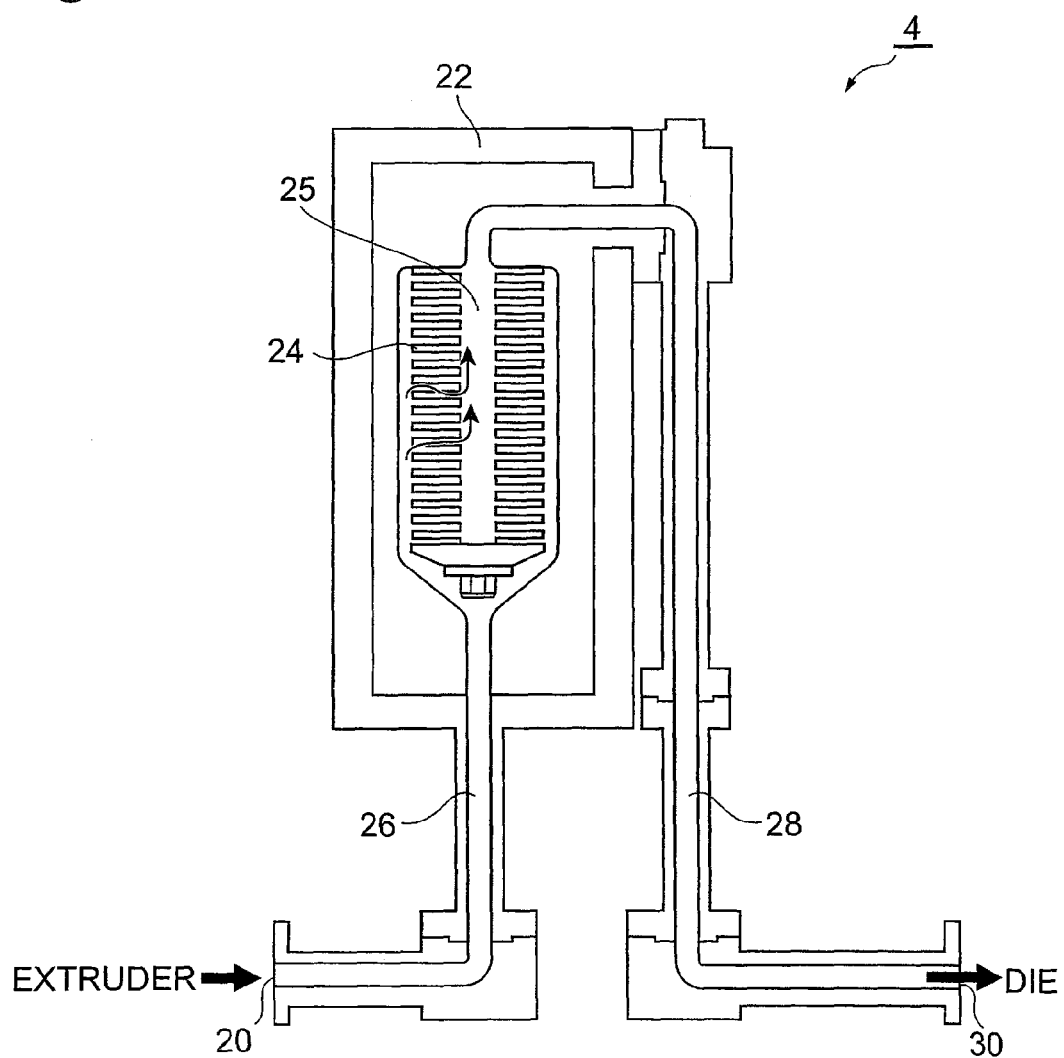
FIG. 2 is a vertical cross-sectional schematic view which illustrates an embodiment of a filter device used for the process for producing a polyolefin resin composition of the present invention.

FIG. 2 is a vertical cross-sectional diagrammatical view which illustrates an embodiment of the filter device 4 used for the production process according to this embodiment. The filter device 4 has a filter housing 22, a plurality of leaf disk type filters 24 provided in the filter housing 22, a tubular member 25 in which the respective leaf disk type filters 24 are fixed, a pipe 26 for supplying the mixed fluid to the leaf disk type filters 24 and a pipe 28 for transferring the fluid which has passed through the leaf disk type filters 24 to the molding equipment 6 provided on the downstream side of a connecting part 30. In this embodiment, the main body section of the filter device consists of the filter housing 22, the pipe 26, the tubular member 25 and the pipe 28.

Figure 3:
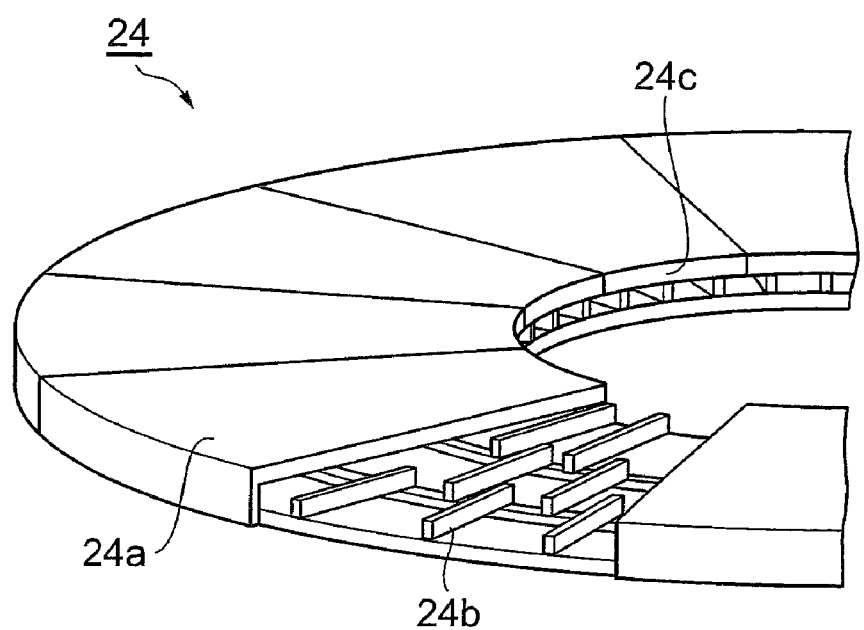
FIG. 3 is a structural view which illustrates an embodiment of the leaf disk type filter used for the process for producing a polyolefin resin composition of the present invention.

FIG. 3 is a structural view which illustrates an embodiment of the leaf disk type filter. The leaf disk type filter 24 has the sintered metal filter 24a and a supporting member 24b which supports the sintered metal filter 24a. The sintered metal filter 24a is not shown on a part of surface of the leaf disk type filter 24 but this is to explain the internal structure of the leaf disk type filter 24, and the sintered metal filter 24a is usually provided on the whole surfaces (on both sides) of the leaf disk type filter 24.

As shown in FIG. 2, the filter device 4 has a constitution having the plurality of leaf disk type filters 24 disposed to the tubular member 25. Each leaf disk type filter 24 is fixed while keeping a section where an edge 24c thereof abuts with the tubular member 25 hermetically sealed. This makes it possible to sufficiently inhibit the fluid from leaking to the downstream through the edge 24c of the sintered metal filter 24a.

The sintered metal filter 24a has a filtration accuracy of 1 to 10 µm. The filtration accuracy as used herein means the size of particles 95% of which are trapped when a filtering test in accordance with JIS-B8356 is performed. When the filtration accuracy is less than 1 µm, a sufficient amount of molten substances per unit time cannot be filtered unless the filtration pressure is increased beyond the allowable pressure of the filter device. On the other hand, when the filtration accuracy exceeds 10 µm, removal of contaminants and dispersion of respective ingredients become insufficient and fisheye reduction effect becomes insufficient as compared with the case that the filtration accuracy is less than 10 µm.

The mixed fluid supplied to the pipe 26 from a connecting part 20 in FIG. 2 is filtered with the leaf disk type filter 24 and thereby becomes a homogeneous polyolefin resin composition mixed to a minute level. Described in more details, the mixed fluid supplied to the pipe 26 from the connecting part 20 is in a state in which a polyolefin ingredient having a higher viscosity disperses in a polyolefin ingredient having a lower viscosity in a state that the former forms aggregates. The aggregates of the polyolefin ingredient having a higher viscosity are dispersed in a polyolefin ingredient having a lower viscosity by forcing the mixed fluid in such a state to pass through the sintered metal filter 24a of the leaf disk type filter 24. As a result, a homogeneous polyolefin resin composition in which respective polyolefin ingredients are dispersed to a minute level can be obtained.

As a sintered metal filter, those produced by sintering stainless steel (SUS316L) fibers, Naslon (registered trademark) produced by Nippon Seisen Co., Ltd., etc. can be preferably used.

When a leaf disk type filter as shown in FIG. 3 is used, it is preferable that the filtration rate of the mixed fluid in the filtering step be 0.001 to 0.2 cm/min. It is more preferable that this filtration rate be 0.02 to 0.15 cm/min. When the filtration rate of the mixed fluid is less than 0.001 cm/min, the retention time of the mixed fluid within the filter becomes excessively long, and the mixed fluid and the polyolefin resin composition tend to deteriorate. On the other hand, when the filtration rate of the mixed fluid exceeds 0.2 cm/min, dispersion of respective polyolefin ingredients contained in the polyolefin resin composition is liable to become worse. The filtration rate as used herein means the flow rate of the fluid passing through the filter. This filtration rate can be determined, for example, by dividing the volumetric flow rate of the filtered mixed fluid per unit time by the filtration area of the filter.

The fluid having passed through the sintered metal filter 24a, namely a polyolefin resin composition, goes along the pipe 28, and it is supplied to a die 32 of the molding equipment 6 from the connecting part 30 (see FIG. 1). Then, a strand extruded through the die 32 in a molten state is cooled and solidified in a water tank 35, and is processed into pellets in a pelletizer 36.

In the process for producing a polyolefin resin composition of the present invention, polyolefin may be further dried as required at a temperature not higher than the melting temperature of the polyolefin so as to remove residual solvent for polyolefin, and super low molecular weight oligomers by-produced at the time of production. As the drying method for that case, methods described in Japanese Patent Laid-Open No. 55-75410, U.S. Pat. No. 2,565,753, etc. are included.

The polyolefin resin composition is pelletized with the molding equipment 6 in this embodiment. A polyolefin film can be produced from the polyolefin resin composition by using a blown film production device or a cast film production device.

Figure 4:
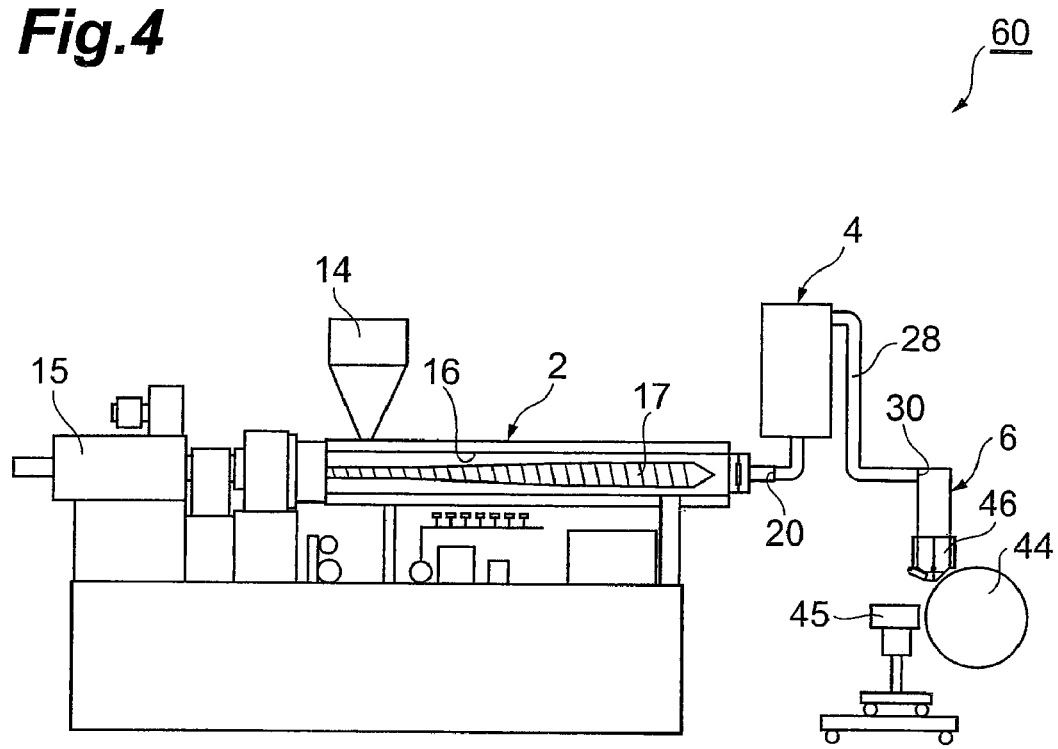
FIG. 4 is a schematic diagram of a production device used for the process for producing a polyolefin resin composition according to another embodiment of the present invention.

FIG. 4 is a schematic diagram which illustrates a device for producing a polyolefin film from a polyolefin resin composition according to this embodiment. This production device 60 has the molding equipment 6 equipped with a cast film production device.

The fluid filtered through the filter device 4, namely a polyolefin resin composition, goes through the connecting part 30 between the filter device 4 and the molding equipment 6, and it is supplied to a die 46 of the molding equipment 6. The molten film (polyolefin resin composition) extruded through the die 46 is stretched to a predetermined thickness with a chill-roll 44 and an air chamber device 45 and can be wound with a rewinder (not shown) after it is cooled and solidified. The thickness of the polyolefin film is preferably 5 to 200 µm.

An example of the molding processing conditions when the cast film production device is used is as follows.

Temperature of molten resin extruded through the die lip: 180 to 300° C.

Shearing rate of the molten resin at the die lip part: 10 to 1500 sec$^{-1}$

Rotation rate of the chill-roll: 10 to 500 m/min

Temperature of the chill-roll: 10 to 80° C.

A polyolefin film can be also produced by stretching a film or sheet obtained by molding a polyolefin resin composition. Examples of the stretching method include methods of monoaxially or biaxially stretching, for example, by a roll stretching method, a tenter stretching method, a tubular stretching method, etc.

As a process for producing a multilayer film as a polyolefin film, a coextrusion method, an extrusion lamination method, a heat lamination method, a dry lamination method, etc., which are usually used, are included.

While the polyolefin resin composition may be shaped in the form of a film and pellets as described above, it may also be shaped in the form of a sheet or a flat board in accordance with the use.

In the polyolefin resin composition obtained by the process for producing a polyolefin resin composition according to the above embodiment, the dispersion of respective polyolefin ingredients is sufficiently good. Since respective polyolefin ingredients are dispersed sufficiently to a minute level in the polyolefin film obtained by such a polyolefin resin composition, the amount of fisheyes caused by poor dispersion is reduced sufficiently as compared with the conventional polyolefin film.

The shaped article of the above polyolefin resin composition can be used, for example, for automotive materials, household appliance materials, films for food packaging, industrial films, medical application materials, OA machinery materials, building materials, sheets, various bottles, etc.

<Second Embodiment>

Figure 5:
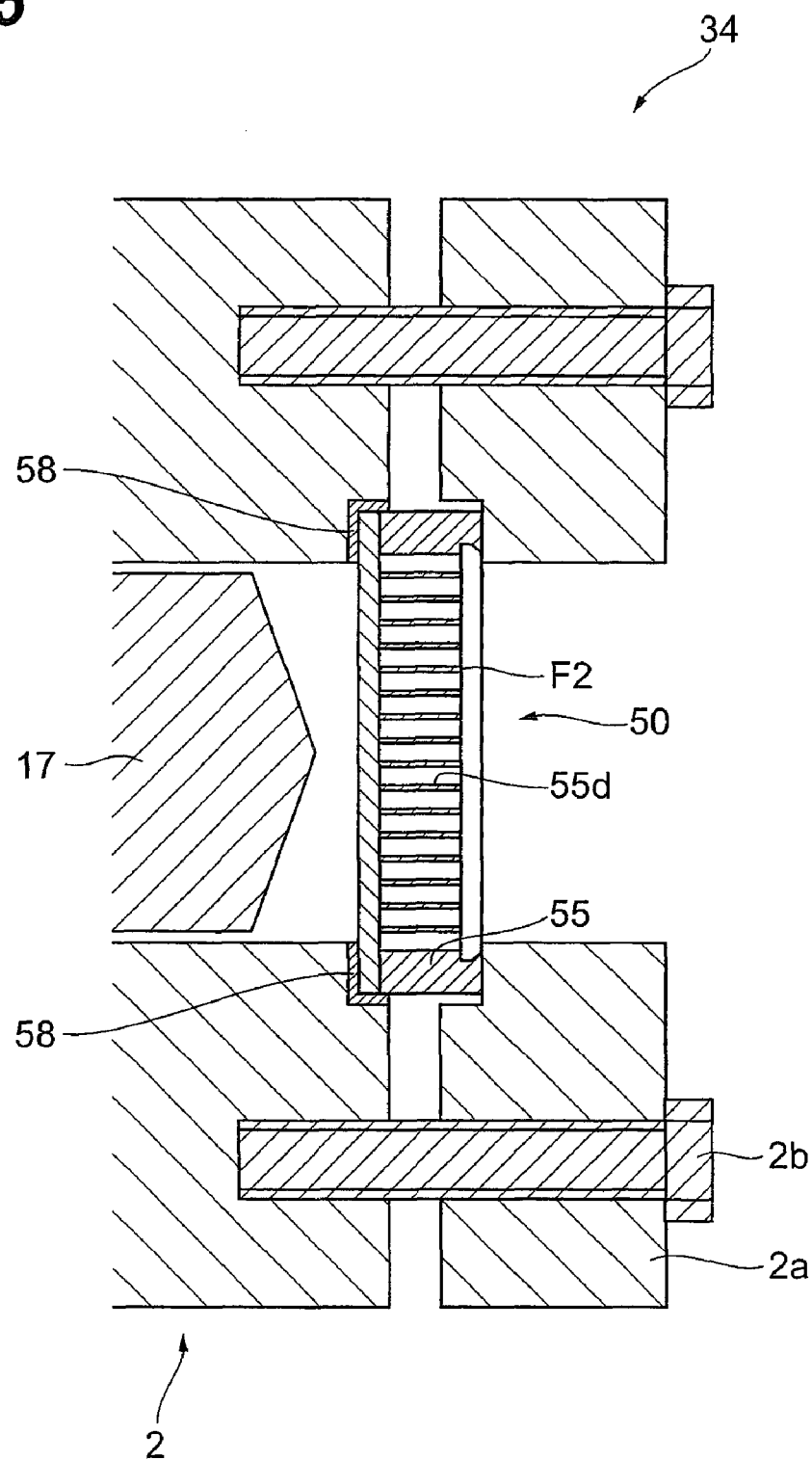
FIG. 5 is a schematic cross-sectional view which illustrates another embodiment of a filter device used for the process for producing a polyolefin resin composition of the present invention.

A process for producing a polyolefin resin composition according to this embodiment is the same as the first embodiment except that the filtering step is performed by a laminate 50 shown in FIG. 5 in substitution for the filter device 4 having the leaf disk type filter 24 and that the physical properties of the mixed fluid, the filtering conditions and so on are changed. In the mixing step in this embodiment, a polyolefin ingredient (A) having an intrinsic viscosity of 3 to 5 dl/g and a polyolefin ingredient (B) having an intrinsic viscosity of 0.5 to 3 dl/g are melt-kneaded to obtain a mixed fluid.

Figure 6:
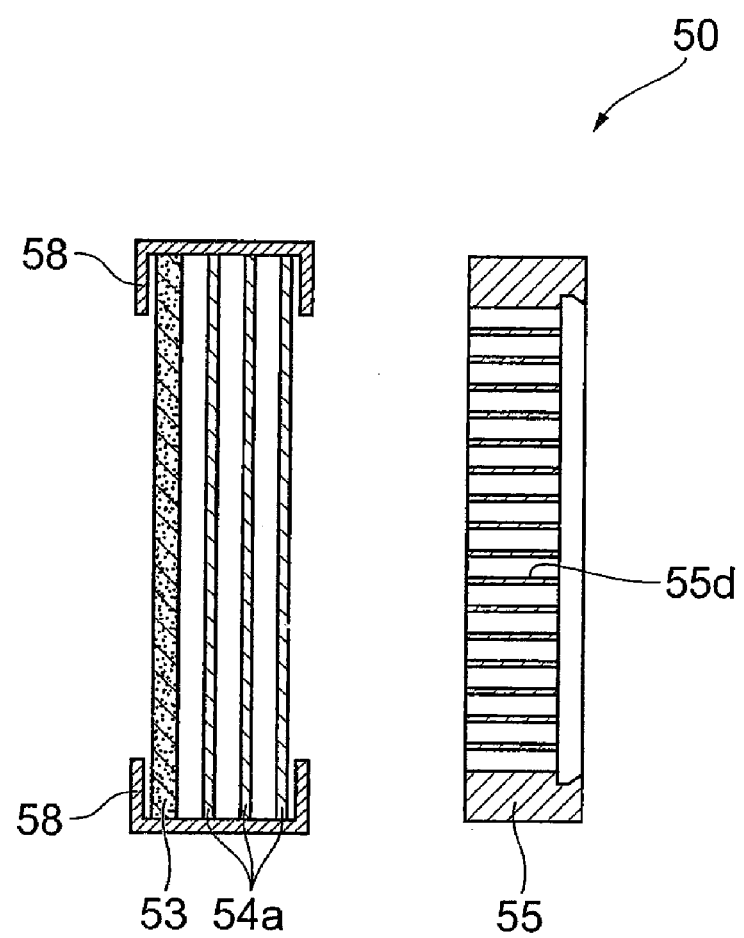
FIG. 6 is a schematic cross-sectional view which illustrates an example of disposition relationship of members forming the laminate illustrated in FIG. 5.

FIG. 5 is a schematic cross-sectional view which enlarges and illustrates a part of a filter device 34 having the laminate 50. The filter device 34 is provided to filter a mixed fluid transferred by a screw 17. The filter device 34 has the laminate 50 and a flange 2a and a bolt 2b to fix this to an extruder 2. FIG. 6 is a schematic cross-sectional view which illustrates the disposition relationship of respective members constituting the laminate 50. The main body section of the device of the filter device 34 consists of the extruder 2, the flange 2a and the bolt 2b in this embodiment.

As shown in FIG. 6, in the laminate 50 which the filter device 34 has, a sintered metal filter 53, a wire netting 54a and a breaker plate (supporting member) 55 are laminated in this order from the upstream side to the downstream side in the flow passage. Here in FIG. 6, the laminate 50 is illustrated in a condition that respective members are separated from each other, but this is to clearly illustrate the disposition relationship, and actually, respective members abut with each other.

Each of the sintered metal filter 53, the wire netting 54a and the breaker plate 55 has a circular profile and they are fixed to the extruder 2 with a seal member 58. The seal member 58 covers the edge of the sintered metal filter 53, and it is located in a section where the laminate 50 and the extruder 2 abut with each other.

The sintered metal filter 53 is provided to remove contaminants contained in the molten substances and to disperse respective polyolefin ingredients from each other by forcing the molten substances to pass therethrough. As the sintered metal filter 53, for example, one produced by sintering stainless steel (SUS316L) fibers may be used. In addition, commercially available sintered metal filters may be also used and, for example, Naslon (product name, produced by Nippon Seisen Co., Ltd.) may be used.

When the filtration rate is set to 0.001 to 20 cm/min, one having a filtration accuracy of 1 to 40 µm is used as the sintered metal filter 53. When the filtration accuracy is less than 1 µm, sufficient amount of molten substances cannot be filtered per unit time unless the filtration pressure is increased beyond the allowable pressure of the filter device. On the other hand, when the filtration accuracy exceeds 40 µm, removal of contaminants and dispersion of respective ingredients become insufficient and fisheye reduction effect becomes insufficient. The filtration accuracy of the sintered metal filter 53 is preferably 10 to 35 µm, and more preferably 20 to 30 µm.

When the filtration rate is set to 0.001 to 100 cm/min, one having a filtration accuracy of 1 to 20 µm is used as the sintered metal filter 53. When the filtration accuracy is less than 1 µm, sufficient amount of molten substances cannot be filtered per unit time unless the filtration pressure is increased to the allowable pressure or more of the filter device. On the other hand, when the filtration accuracy exceeds 20 µm, removal of contaminants and dispersion of respective ingredients become insufficient and fisheye reduction effect becomes insufficient. The filtration accuracy of the sintered metal filter 53 is preferably 5 to 15 µm.

One piece or two or more pieces of the wire netting 54a is disposed on the downstream side of the sintered metal filter 53 and the wire netting 54a is directly in contact with the sintered metal filter 53. It is preferable that a line diameter of the wire netting 54a be 0.01 to 0.25 mm. In the case that the line diameter of the wire netting 54a is less than 0.01 mm, the sintered metal filter 53 tends to be deformed or broken when the sintered metal filter 53 was pushed into an opening 55d of the breaker plate 55 by filtration pressure. On the other hand, when the line diameter of the wire netting 54a exceeds 0.25 mm, wires constituting the wire netting 54a bite into the sintered metal filter 53 during filtration, which may cause deformation of the sintered metal filter 53 and decrease in the filtration accuracy. The line diameter of the wire netting 54a is preferably 0.03 to 0.23 mm, and more preferably 0.05 to 0.20 mm. In addition, the mesh count of the wire netting 54a is preferably 30 to 500, and more preferably 40 to 150 mesh from a similar viewpoint of the line diameter of the wire netting 54a. The mesh count (mesh) of the wire netting as used herein means the number of mesh present within 1 inch (25.4 mm).

It is preferable that a plurality of pieces (for example, 2 to 10 pieces) of the wire netting 54a be laminated between the sintered metal filter 53 and the breaker plate 55 as shown in FIG. 6 from a viewpoint of more surely preventing occurrence of deformation or breakage of the sintered metal filter 53 in the opening 55d of the breaker plate 55.

Figure 7:
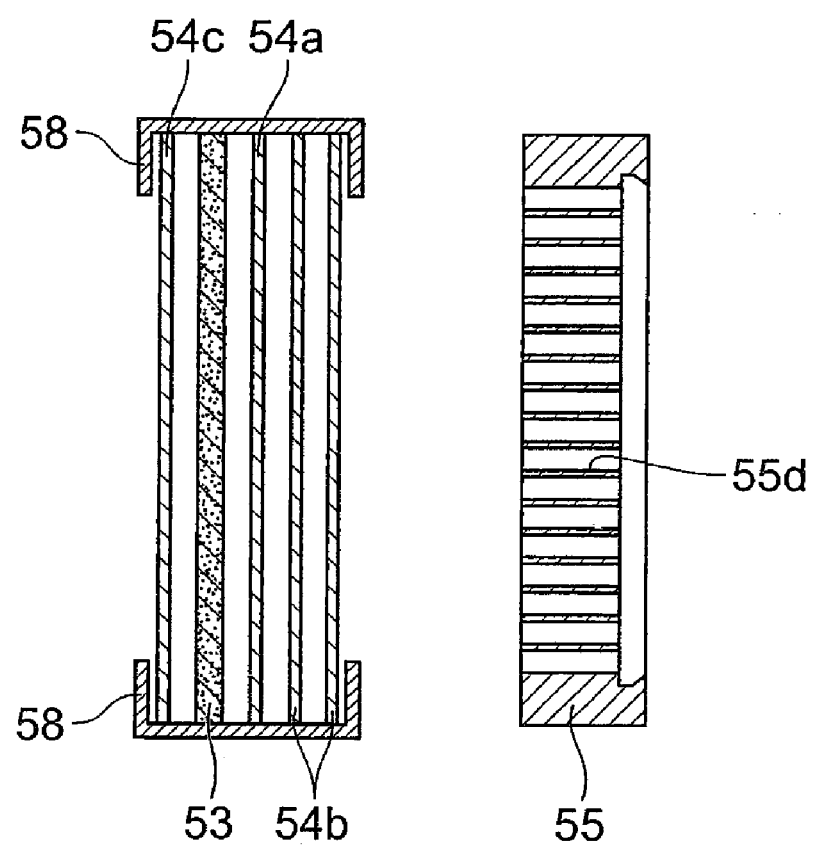
FIG. 7 is a schematic cross-sectional view which illustrates another example of disposition relationship of members forming the laminate illustrated in FIG. 5.

Here, the laminate 50 may have other wire nettings as long as the downstream side surface of the sintered metal filter 53 and the wire netting 54a (line diameter: 0.01 to 0.25 mm) are directly in contact. For example, one piece or two or more pieces (for example, 2 to 10 pieces) of the wire netting 54b having a line diameter of 0.01 to 1 mm may be laminated between the wire netting 54a and the breaker plate 55 as shown in FIG. 7. In addition, a wire netting 54c having a line diameter of 0.01 to 0.25 mm may be further disposed so that the wire netting 54c can abut with the upstream side surface of the sintered metal filter 53 so as to prevent the sintered metal filter 53 from locally collapsing when the sintered metal filter 53 is set to the extruder 2.

Figure 8:
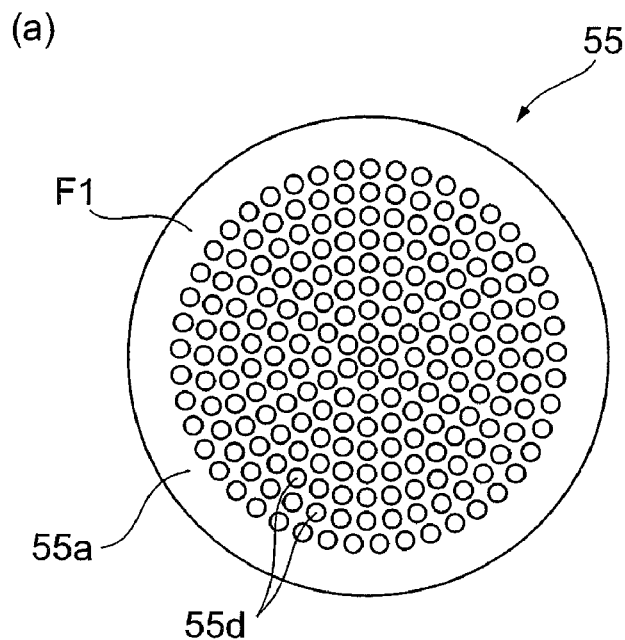
FIG. 8 illustrates an example of a circular breaker plate.
Figure 8:
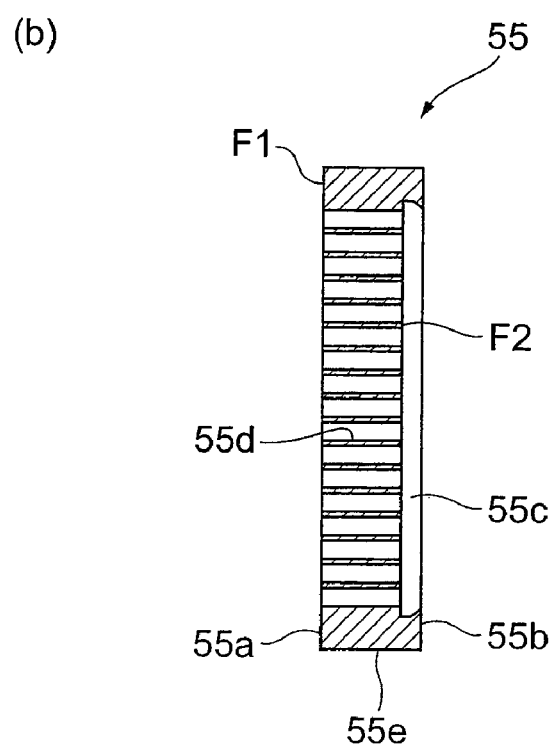

The breaker plate 55 is to support the sintered metal filter 53 and the wire netting 54a. FIG. 8(A) is a front elevation view showing the upstream side surface of the breaker plate 55, and FIG. 8(B) is a cross-sectional view of the breaker plate 55. As shown in FIG. 8, whereas an upstream side surface F1 of the breaker plate 55 is configured so that an edge 55a may be in a plane with the other areas, a downstream side surface F2 is formed so that an edge 55b will rise while the other areas form a recessed part 55c.

It is preferable that the breaker plate 55 be a structure body which is hardly distorted even when the filtration pressure is imposed thereon. When the breaker plate 55 deforms by filtration pressure, it causes deformation or damage in the sintered metal filter 53 and so on, which are supported thereby, and contaminants become easy to leak to the downstream side. From this viewpoint, carbon steel, for example, is preferable as a material of the breaker plate 55. Examples of suitable materials other than carbon steel include special steels containing nickel, chrome, and tungsten. It is preferable that the thickness of the breaker plate 55 be 10 to 100 mm from a viewpoint of sufficiently securing the strength.

The breaker plate 55 has a plurality of openings 55d each having a diameter of 1 to 10 mm which penetrate in the thickness direction. The aperture ratio of the breaker plate 55 is 30 to 60%. When the breaker plate 55 having an aperture ratio less than 30% is used, sufficient amount of molten substances cannot be filtered per unit time unless the filtration pressure is increased beyond the allowable pressure of the filter device. On the other hand, when the breaker plate 55 having an aperture ratio more than 50% is used, volume of deformation of the breaker plate 55 increases by the filtration pressure. The aperture ratio of the breaker plate 55 is preferably 35 to 55%, and more preferably 40 to 50%.

The seal member 58 is to prevent the molten substances from leaking to the downstream side through the edge 55a and a side 55e of the breaker plate 55. Packings made of a resin (for example, fluorinated resin) or a metal plate (for example, iron plate, aluminum sheet, copper sheet) can be preferably used as the seal member 58. It is preferable that the seal member 58 be disposed to integrally cover the edges of the sintered metal filter 53 and the wire netting 54a as shown in FIGS. 6 and 7.

The laminate 50 (the sintered metal filter 53, the wire netting 54a, the breaker plate 55, etc.) is attachably and detachably attached to the extruder 2. Adopting such a constitution is advantageous in that exchange and washing of each constitution member can be performed easily.

Fixing the laminate 50 to the extruder 2 may be carried out by stacking the sintered metal filter 53, the wire netting 54a, etc. on the surface F1 of the breaker plate 55 allowing the flange of the main body side of the extruder 2 and the edge of the sintered metal filter 53 to abut through the seal member 58 and fixing with bolts 2b after allowing the edge 55b and the flange 2a of the surface F2 of the breaker plate 55 to abut with each other (see FIG. 5). This brings the section where the sintered metal filter 53 and the extruder 2 abut with each other to a condition hermetically sealed with the seal member 58 and makes it possible to sufficiently inhibit the fluid from leaking to the downstream side through the edge of the sintered metal filter 53.

Figure 9:
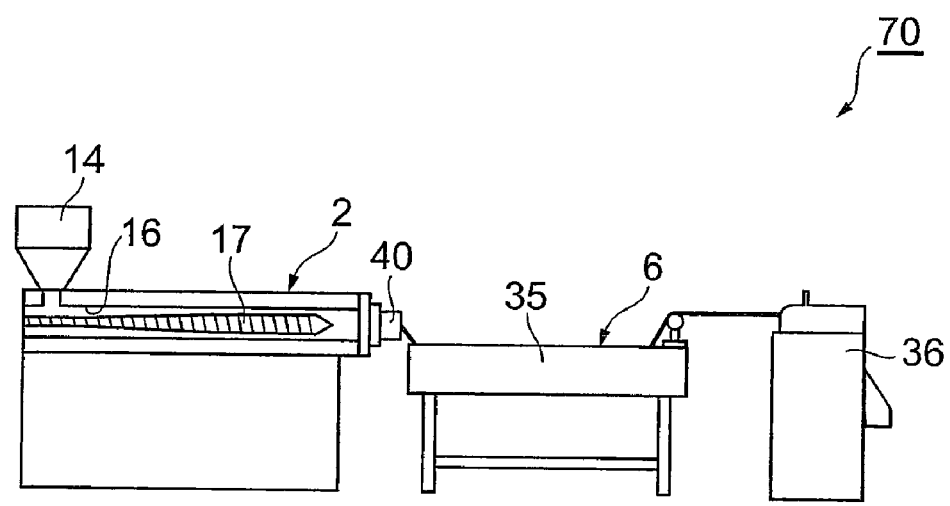
FIG. 9 is a schematic diagram of the production device comprising a screen pack used for the process for producing a polyolefin resin composition.
Figure 10:
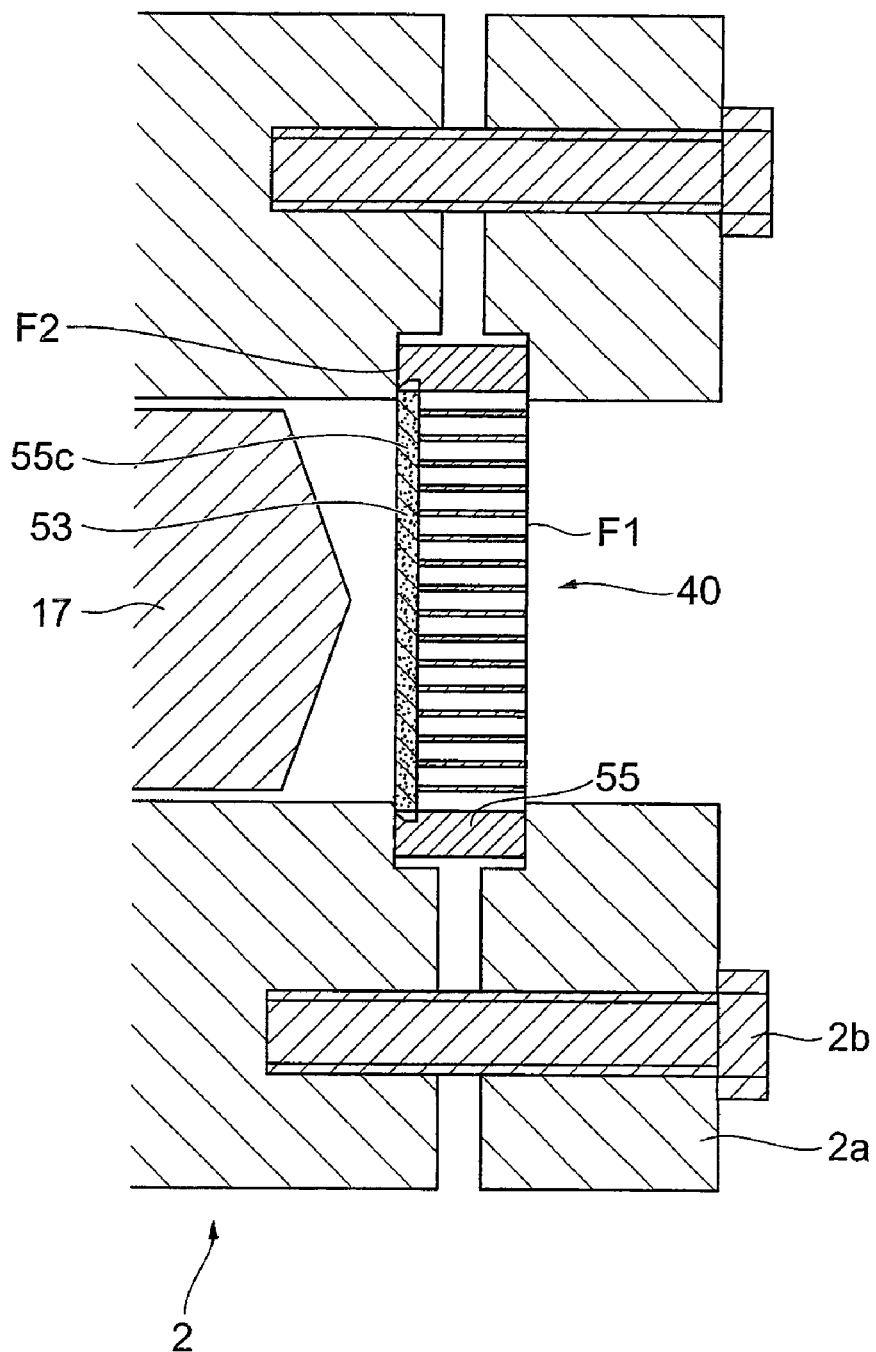
FIG. 10 is a schematic cross-sectional view which illustrates an example of the constitution of the screen pack illustrated in FIG. 9.

Conventionally, when a screen pack 40 having the breaker plate 55 is set to the outlet of the extruder 2 as shown in FIG. 9, it is installed with the surface F2 facing upstream and the sintered metal filter 53 disposed in the recessed part 55c thereof as shown in FIG. 10. In this case, leaking from the surface where the surface F2 and the sintered metal filter 53 abut with each other is easy to occur. In contrast, in this embodiment, the surface F1 formed in a plane faces upstream and the sintered metal filter 53 extends to the edge 55a and besides the seal member 58 is used and thereby it is enabled to hermetically seal the edge and to sufficiently inhibit the leaking.

The mixed fluid having passed through the sintered metal filter 53 and thus having been put out of the filtering step is supplied to a die 32 of a molding equipment 6 as in the above-mentioned first embodiment (see FIG. 1), and processed into pellets or a film.

While circular ones are provided as examples of the sintered metal filter 53, the wire netting 54a, the breaker plate 55, etc., but these profiles may be oval, cylindrical, conic, etc. When cylindrical or conic ones are adopted, there are advantages that the filtration area is easy to be increased and filtration processing can be performed at a lower filtration pressure as compared with the case that circular or oval ones are adopted.

EXAMPLES

Hereinbelow, the present invention is more specifically described based on Examples and Comparative Examples and sometimes using drawings, but the present invention is not limited to the following Examples at all. Respective physical properties and evaluations in the respective Examples and Comparative Examples are determined in accordance with the following methods.

(1) Content (Unit: Mass %) of Respective Polyolefin Ingredients (ingredient (A), ingredient (B))

The content (PA) of the ingredient (A) and the content (PB) of the ingredient (B) are determined from mass balance when the ingredient (A) and the ingredient (B) are produced.

(2) Intrinsic Viscosity ([η], Unit: dl/g)

The measurement was performed using an Ubbelohde viscometer in tetralin at 135° C. When the ingredient (A) is produced first, the intrinsic viscosity ($[\eta]_B$) of the ingredient (B) is determined by the expression (I) from an intrinsic viscosity $[\eta]_A$ of the ingredient (A) measured after the end of production of the ingredient (A), an intrinsic viscosity ($[\eta]_{AB}$) of the polyolefin ingredient measured after the end of production of the second step, and a content (PA) of the ingredient (A) and a content (PB) of the ingredient (B). When the ingredient (B) is produced first, the intrinsic viscosity ($[\eta]_A$) of the ingredient (A) is similarly determined.

$$[\eta]_A \times (PA/100) + [\eta]_B \times (PB/100) = [\eta]_{AB} \quad (I)$$

(3) Content (Unit: Mass %) of the Structural Unit Derived from Ethylene Contained in a Propylene-Ethylene Copolymer Ingredient The content of the structural unit derived from ethylene was determined by an IR spectrum method based on a method described in pages 256-257 "(ii) Block copolymer" of "Kobunshi Bunseki Handbook" (Polymer Analysis Handbook) (1985, published by Asakura Shoten).

(4) Melt Flow Rate (MFR, Unit: g/10 Minutes)

The melt flow rate was determined by measuring in accordance with a method of condition-14 based on JIS-B7210.

(5) Filtration Accuracy (Unit: μm)

A filtration test was performed based on JIS-B8356, and the size of particles 95% of which were trapped was measured and thereby the filtration accuracy of the sintered metal filter was determined.

(6) Fisheye (Unit: /225 cm$^2$)

A surface of a polypropylene film sample cut into 15-cm square was visually observed and the number of all existing fisheyes was counted.

(7) Filtration Area (Unit: cm$^2$)

Examples 1 to 3: The total of the filter medium surface areas fixed in a leaf disk type filter was assumed as a filtration area.

Examples 4 to 11 and Comparative Examples 1 to 15: The cross section of the flow passage (extruder side) which faced the filter medium was assumed as a filtration area.

(8) Filtration Rate (Unit: cm/min)

The filtration rate was calculated using values of extrusion output (kg/hr) of the mixed fluid kneaded in the extruder and filtration area (cm$^2$), assuming that the molten density of the polypropylene resin composition is 0.72 g/cm$^3$.

Six polypropylene polymers were prepared in the following procedures.

<Polypropylene Polymer 1>

A Ziegler Natta type catalyst of a Ti—Mg type catalyst was continuously supplied into liquid propylene to produce a propylene polymer (ingredient (A)) with substantially no hydrogen (first step). This ingredient (A) was sampled, and analysis thereof revealed that the intrinsic viscosity $[\eta]_A$ was 7.9 dl/g. Successively, the polymer obtained in the first step was continuously transferred to the second step (vapor phase polymerization tank) without deactivating the polymer.

In the second step, a propylene polymer was continuously produced from the catalyst containing polymer transferred from the first step while supplying propylene and hydrogen to a vapor phase polymerization tank to obtain a polypropylene polymer 1 containing the ingredient (A) and the ingredient (B) and having an intrinsic viscosity of 1.88 dl/g.

The ratio of the ingredient (A) to the ingredient (B) in the polypropylene polymer 1 was A/B=11/89 (mass ratio). The intrinsic viscosity $[\eta]_B$ of the ingredient (B) determined from this ratio and the above intrinsic viscosity was 1.14 dl/g. The ratio ($[\eta]_A/[\eta]_B$) of the intrinsic viscosity of the ingredient (A) to the ingredient (B) was 6.93.

<Polypropylene Polymer 2>

A propylene homopolymer (ingredient (B)) was produced using a Ziegler Natta type catalyst of a Ti—Mg type catalyst in a vapor phase polymerization tank (first step). This ingredient (B) was sampled, and analysis thereof revealed that the intrinsic viscosity $[\eta]_B$ was 1.7 dl/g. Successively, the polymer obtained in the first step was continuously transferred to the second step without deactivating the polymer.

In the second step, a propylene-ethylene copolymer (ingredient (A)) was continuously produced from the catalyst containing polymer transferred from the first step while supplying propylene, ethylene and hydrogen to another vapor phase polymerization tank connected to the vapor phase polymerization tank used in the first step to obtain a propylene-ethylene block copolymer (polypropylene polymer 2) having an intrinsic viscosity of 2.04 dl/g.

The ratio of the ingredient (A) to the ingredient (B) in the polypropylene polymer 2 was A/B=21/79 (mass ratio). The intrinsic viscosity $[\eta]_A$ of the ingredient (A) determined from this ratio and the above intrinsic viscosity was 3.3 dl/g and the ethylene content was 31 mass %. The ratio ($[\eta]_A/[\eta]_B$) of the intrinsic viscosity of the ingredient (A) to the ingredient (B) was 1.94.

<Polypropylene Polymer 3>

A propylene homopolymer (ingredient (B)) was produced using a Ziegler Natta type catalyst of a Ti—Mg type catalyst in a vapor phase polymerization tank (first step). This ingredient (B) was sampled, and analysis thereof revealed that the intrinsic viscosity $[\eta]_B$ was 1.0 dl/g. Successively, the polymer obtained in the first step was continuously transferred to the second step without deactivating the polymer.

In the second step, a propylene-ethylene copolymer (ingredient (A)) was continuously produced from the catalyst containing polymer transferred from the first step while supplying propylene, ethylene and hydrogen to another vapor phase polymerization tank connected to the vapor phase polymerization tank used in the first step to obtain a propylene-ethylene block copolymer (polypropylene polymer 3) having an intrinsic viscosity of 1.56 dl/g.

The ratio of the ingredient (A) to the ingredient (B) in the polypropylene polymer 3 was A/B=16/84 (mass ratio). The intrinsic viscosity $[\eta]_A$ of the ingredient (A) determined from the above results was 4.5 dl/g and the ethylene content was 38 mass %. The ratio ($[\eta]_A/[\eta]_B$) of the intrinsic viscosity of the ingredient (A) to the ingredient (B) was 4.5.

<Polypropylene Polymer 4>

A propylene homopolymer (ingredient (B)) was produced using a Ziegler Natta type catalyst of a Ti—Mg type catalyst in a vapor phase polymerization tank (first step). This ingredient (B) was sampled, and analysis thereof revealed that the intrinsic viscosity $[\eta]_B$ was 1.8 dl/g. Successively, the polymer obtained in the first step was continuously transferred to the second step without deactivating the polymer.

In the second step, a propylene-ethylene copolymer (ingredient (A)) was continuously produced from the catalyst containing polymer transferred from the first step while supplying propylene, ethylene and hydrogen to another vapor phase polymerization tank connected to the vapor phase polymerization tank used in the first step to obtain a propylene-ethylene block copolymer (polypropylene polymer 4) having an intrinsic viscosity of 2.15 dl/g.

The ratio of the ingredient (A) to the ingredient (B) in the polypropylene polymer 4 was A/B=25/75 (mass ratio). The intrinsic viscosity $[\eta]_A$ of the ingredient (A) determined from this ratio and the above intrinsic viscosity was 3.2 dl/g and the ethylene content was 41 mass %. The ratio ($[\eta]_A/[\eta]_B$) of the intrinsic viscosity of the ingredient (A) to the ingredient (B) was 1.6.

<Polypropylene Polymer 5>

A propylene homopolymer having an intrinsic viscosity of 3.0 dl/g was produced using a Ziegler Natta type catalyst of a Ti—Mg type catalyst in a vapor phase polymerization tank.

<Polypropylene Polymer 6>

A propylene homopolymer having an intrinsic viscosity of 1.6 dl/g was produced using a Ziegler Natta type catalyst of a Ti—Mg type catalyst in a vapor phase polymerization tank.

Example 1

The polypropylene polymer 1 (100 mass parts) and 0.2 mass part of a phenolic antioxidant (product name Irganox1010 produced by Ciba Specialty Chemicals Co., Ltd.) and 0.1 mass part of a phosphorous acid ester (product name Sumilizer GP produced by Sumitomo Chemical Co., Ltd.) were mixed in a Henschel mixer, whereby a polypropylene composition was prepared.

A production device 1 as shown in FIG. 1 was prepared. This production device 1 has a kneading-extruder 2 (single screw extruder (screw diameter 40 mm$\phi$) manufactured by Tanabe Plastic Machine Co., Ltd.), a leaf disk filter 4 (manufactured by Nagase & Co., Ltd., having ten pieces of disks; outside diameter of each disk: 5 inches; sintered metal filter (filtration accuracy: 10 µm, filtration area: 4,072 cm$^2$)), a water tank 35 and a pelletizer 36.

The prepared polypropylene composition was melt-extruded in conditions of preset temperature of the extruder of 240° C. and extrusion output of 14 kg/hr, and a melt-kneaded polypropylene mixed fluid was obtained. This polypropylene mixed fluid was filtered through the leaf disk filter 4 and a polypropylene resin composition was obtained in pellets.

The obtained polypropylene resin composition was molded with a cast film process machine (manufactured by Tanabe Plastics Machine Co., Ltd.) having a single screw extruder with a screw diameter of 50 mm$\phi$ to prepare a polypropylene film having a thickness of 30 µm and a width of 300 mm, which was used for evaluation of fisheye.

Comparative Example 1

A production device 70 as shown in FIGS. 9 and 10 was prepared in place of the production device (FIG. 1) used in Example 1. This production device 70 has a twin screw extruder 2 (product name: TEX30 manufactured by Japan Steel Works, Co., Ltd.), a screen pack 40 (filtration area: 16.1 cm², sintered metal filter, filtration accuracy: 10 μm), a water tank 35 and a pelletizer 36.

A polypropylene resin composition and a polypropylene film were prepared and evaluated as in Example 1 except that the production device 70 was used and extrusion output of the polypropylene mixed fluid was changed to 3 kg/hr.

Comparative Example 2

A polypropylene resin composition and a polypropylene film were prepared and evaluated as in Example 1 except that a screen pack 40 (filtration area: 12.6 cm², sintered metal filter, filtration accuracy: 10 μm) shown in FIGS. 9 and 10 was used in place of the leaf disk type filter 4 (FIG. 1) used in Example 1.

Example 2

A polypropylene resin composition and a polypropylene film were prepared and evaluated as in Example 1 except that polypropylene polymer 2 was used in place of polypropylene polymer 1 and extrusion output of the polypropylene mixed fluid was changed to 6 kg/hr.

Comparative Example 3

A polypropylene resin composition and a polypropylene film were prepared and evaluated as in Example 2 except that a screen pack 40 (filtration area: 12.6 cm², 100 mesh wire netting filters) shown in FIGS. 9 and 10 was used in place of the leaf disk type filter 4 (FIG. 1) used in Example 2 and extrusion output of the polypropylene mixed fluid was changed to 10 kg/hr.

Comparative Example 4

A polypropylene resin composition and a polypropylene film were prepared and evaluated as in Example 2 except that a screen pack 40 (filtration area: 12.6 cm², sintered metal filter, filtration accuracy: 40 μm) shown in FIGS. 9 and 10 was used in place of the leaf disk type filter 4 (FIG. 1) used in Example 2 and extrusion output of the polypropylene mixed fluid was changed to 10 kg/hr.

Comparative Example 5

A polypropylene resin composition and a polypropylene film were prepared and evaluated as in Example 2 except that a screen pack 40 (filtration area: 12.6 cm², sintered metal filter, filtration accuracy: 10 μm) shown in FIGS. 9 and 10 was used in place of the leaf disk type filter 4 (FIG. 1) used in Example 2.

Example 3

A polypropylene resin composition and a polypropylene film were prepared and evaluated as in Example 1 except that polypropylene polymer 3 was used in place of polypropylene polymer 1 and extrusion output of the polypropylene mixed fluid was changed to 18 kg/hr.

Conditions and results of Examples 1 to 3 and Comparative Examples 1 to 5 are shown in Table 1.

TABLE 1

| | Raw Materials | | | | Intrinsic Viscosity of Mixed Fluid (dl/g) | Extrusion Output (kg/hr) | Filtration Area (cm²) | Filtration Accuracy (μm) | Filtration Rate (cm/min) | Seal at Edge | Number of Fisheyes (/225 cm²) |
|---|---|---|---|---|---|---|---|---|---|---|---|
| | Ingredient (A) | | Ingredient (B) | | | | | | | | |
| | Intrinsic Viscosity (dl/g) | Ratio (wt %) | Intrinsic Viscosity (dl/g) | Ratio (wt %) | | | | | | | |
| Ex. 1 | 79 | 11 | 1.14 | 89 | 1.88 | 14 | 4072 | 10 | 0.078 | Sealed | 8 |
| Com. Ex. 1 | | | | | | 3 | 16.1 | 10 | 4.9 | Not Sealed | 790 |
| Com. Ex. 2 | | | | | | 14 | 12.6 | 10 | 25.7 | Not Sealed | 10075 |
| Ex. 2 | 3.3 | 21 | 1.7 | 79 | 2.04 | 6 | 4072 | 10 | 0.034 | Sealed | 0 |
| Com. Ex. 3 | | | | | | 10 | 12.6 | 150 | 18.4 | Not Sealed | 890 |
| Com. Ex. 4 | | | | | | 10 | 12.6 | 40 | 18.4 | Not Sealed | 188 |
| Com. Ex. 5 | | | | | | 6 | 12.6 | 10 | 11.0 | Not Sealed | 378 |
| Ex. 3 | 4.5 | 16 | 1.0 | 84 | 1.56 | 18 | 4072 | 10 | 0.102 | Sealed | 2 |

Example 4

The polypropylene polymer 2 (100 mass parts), 0.2 mass part of a phenolic antioxidant (product name: Irganox1010 produced by Ciba Specialty Chemicals Co. Ltd.) and 0.05 mass part of a phosphorus antioxidant (product name: Irgafos168 produced by Ciba Specialty Chemicals Co. Ltd.) were mixed. The mixture was introduced into a twin-screw granulating machine and pelletized.

A film was prepared as follows using a coextrusion cast film processing device provided with an extruder M having a flow passage whose inside diameter was 93 mm; an extruder A having a flow passage whose inside diameter was 68 mm; and an extruder B having a flow passage whose inside diameter was 68 mm.

First, laminates for forcing molten raw materials to pass therethrough were installed respectively in the flow passage of the extruder M and the extruders A and B. Laminates in which a wire netting, a sintered metal filter, a plurality of wire nettings and a breaker plate disposed in this order from the upstream side to the downstream side of the flow passage were fixed with bolts between a flange of the outlet side of each extruder and a flange of the base-end side of the feeding pipe.

Constitution of the laminates attached to the extruder M is as shown below. A sealing tape made of Teflon (registered trademark) was wound around the edges of the sintered metal filter and so on and laminates were fixed in the main body section of the device of the extruders M and A through this sealing tape (see FIG. 5).

Wire netting: Line diameter 0.10 mm, Mesh count: 80 mesh, Diameter: 110 mm, one piece, Sintered metal filter: Filtration accuracy: 40 μm (product name: Naslon NF12D produced by Nippon Seisen Co., Ltd.), Wire netting: Line diameter 0.10 mm, Mesh count: 80 mesh, one piece, Wire netting: Line diameter 0.22 mm, Mesh count: 50 mesh, three pieces, Breaker plate: Diameter: 110 mm, Thickness of the flow passage surface: 18 mm, Diameter of the flow passage surface: 93 mm, Laminate fixed width: 8 mm, Diameter of the opening: 4 mm, Number of the openings: 217, Aperture ratio: 40%.

Constitution of the laminates attached to extruder A is as shown below. A sealing tape made of Teflon (registered trademark) was wound around the edges of the sintered metal filter and so on and a laminate was fixed in the main body section of the device of the extruder A through this sealing tape (see FIG. 5).

Wire netting: Line diameter 0.10 mm, Mesh count: 80 mesh, Diameter: 85 mm, one piece, Sintered metal filter: Filtration accuracy: 40 μm (product name: Naslon NF12D produced by Nippon Seisen Co., Ltd.), Wire netting: Line diameter 0.10 mm, Mesh count: 80 mesh, one piece, Wire netting: Line diameter 0.22 mm, Mesh count: 50 mesh, three pieces, Breaker plate: Diameter: 85 mm, Thickness of the flow passage surface: 18 mm, Diameter of the flow passage surface: 68 mm, Filter medium fixed width: 8 mm, Diameter of the opening: 4 mm, Number of the openings: 101, Aperture ratio: 35%.

A laminate having a similar constitution as one attached to the extruder A was attached to the extruder B.

After the laminates were installed to each extruder and the temperature of the film process machine became stable, polypropylene polymer 2 in the form of pellets was supplied to the extruders A, M and B.

Extrusion outputs for the extruders A, M and B were set to 5 kg/hr, 10 kg/hr and 5 kg/hr, respectively and extruded from the T-die.

The molten extruded films were cooled and solidified with a chill-roll (rotation rate: 11 m/min) and a film having a thickness of 30 μm was obtained. Water for regulating the temperature of the chill-roll was at 40° C.

Example 5

A polypropylene resin composition and a polypropylene film were prepared and evaluated as in Example 4 except that the extrusion outputs of the extruders A, M and B were set to 20 kg/hr, 40 kg/hr and 20 kg/hr, respectively, and the rotation rate of the chill-roll was set to 39 m/min.

Comparative Example 6

A polypropylene resin composition and a polypropylene film were prepared and evaluated as in Example 4 except that the extrusion outputs of the extruders A, M and B were set to 85 kg/hr, 280 kg/hr and 85 kg/hr, respectively, and the rotation rate of the chill-roll was set to 250 m/min.

Comparative Example 7

A polypropylene resin composition and a polypropylene film were prepared and evaluated as in Example 4 except that a sintered metal filter having a filtration accuracy of 60 μm (product name: Naslon NF13D produced by Nippon Seisen Co., Ltd.) was installed in the extruders A, M and B in place of a sintered metal filter having a filtration accuracy of 40 μm.

Comparative Example 8

A polypropylene resin composition and a polypropylene film were prepared and evaluated as in Example 7 except that the extrusion outputs of the extruders A, M and B were set to 20 kg/hr, 40 kg/hr and 20 kg/hr, respectively, and the rotation rate of the chill-roll was set to 39 m/min.

Comparative Example 9

A polypropylene resin composition and a polypropylene film were prepared and evaluated as in Example 4 except that a sintered metal filter having a filtration accuracy of 100 μm (product name: Naslon NF15N produced by Nippon Seisen Co., Ltd.) was installed in the extruders A, M and B in place of a sintered metal filter having a filtration accuracy of 40 μm.

Comparative Example 10

A polypropylene resin composition and a polypropylene film were prepared and evaluated as in Comparative Example 9 except that the extrusion outputs of the extruders A, M and B were set to 20 kg/hr, 40 kg/hr and 20 kg/hr, respectively, and the rotation rate of the chill-roll was set to 39 m/min.

Example 6

The polypropylene polymer 4 (100 mass parts), 0.1 mass part of a phenolic antioxidant (product name: Irganox1010 produced by Ciba Specialty Chemicals Co. Ltd.) and 0.03 mass part of vitamin E were mixed. The mixture was introduced into a twin-axis granulating machine and pelletized. A polypropylene resin composition and a polypropylene film were prepared and evaluated as in Example 4 except that the pellets were used as raw materials.

Example 7

A film was prepared and evaluated as in Example 6 except that the extrusion outputs of the extruders A, M and B were set to 20 kg/hr, 40 kg/hr and 20 kg/hr, respectively, and the rotation rate of the chill-roll was set to 40 m/min.

Comparative Example 11

A polypropylene resin composition and a polypropylene film were prepared and evaluated as in Example 6 except that the extrusion outputs of the extruders A, M and B were set to 40 kg/hr, 80 kg/hr and 40 kg/hr, respectively, and the rotation rate of the chill-roll was set to 51 m/min.

Example 8

A polypropylene resin composition and a polypropylene film were prepared and evaluated as in Example 4 except that a sintered metal filter having a filtration accuracy of 20 μm (product name: Naslon NF08D produced by Nippon Seisen Co., Ltd.) was installed in the extruders A, M and B in place of a sintered metal filter having a filtration accuracy of 40 μm.

Example 9

A polypropylene resin composition and a polypropylene film were prepared and evaluated as in Example 8 except that the extrusion outputs of the extruders A, M and B were set to 20 kg/hr, 40 kg/hr and 20 kg/hr, respectively, and the rotation rate of the chill-roll was set to 39

Example 10

A polypropylene resin composition and a polypropylene film were prepared and evaluated as in Example 8 except that the extrusion outputs of the extruders A, M and B were set to 75 kg/hr, 130 kg/hr and 75 kg/hr, respectively, and the rotation rate of the chill-roll was set to 154 m/min.

Example 11

The polypropylene polymer 5 (100 mass parts) and 0.15 mass part of a phenolic antioxidant (product name: Irganox1010 produced by Ciba Specialty Chemicals Co. Ltd.) were mixed. The mixture was introduced into a twin-screw granulating machine and pelletized. In addition, the polypropylene polymer 6 (100 mass parts), 0.18 mass part of a phenolic antioxidant (product name: Irganox1010 produced by Ciba Specialty Chemicals Co. Ltd.) and 0.22 mass part of a phosphorus antioxidant (product name: Irgafos168 produced by Ciba Specialty Chemicals Co. Ltd.) were mixed. The mixture was introduced into a twin-screw granulating machine and pelletized.

35 mass parts of a polypropylene resin prepared by pelletizing the polypropylene polymer 5 and 65 mass parts of a polypropylene resin prepared by pelletizing the polypropylene polymer 6 were mixed in the form of pellets, and the mixture was supplied to the extruders A, M and B.

A polypropylene resin composition and a polypropylene film were prepared and evaluated as in Example 8 except that the above pellets were used as raw materials and the extrusion outputs of the extruders A, M and B were set to 20 kg/hr, 40 kg/hr and 20 kg/hr, respectively, and the rotation rate of the chill-roll was set to 39 m/min.

Comparative Example 12

The polypropylene polymer 1 (100 mass parts), 0.15 mass part of a phenolic antioxidant (product name: Irganox1010 produced by Ciba Specialty Chemicals Co. Ltd.) and 0.1 mass part of a phosphorus antioxidant (product name: Irgafos168 produced by Ciba Specialty Chemicals Co. Ltd.) were mixed. The mixture was introduced into a twin-screw granulating machine and pelletized.

A polypropylene resin composition and a polypropylene film were prepared and evaluated as in Example 4 except that the above pellets were used as raw materials, a sintered metal filter having a filtration accuracy of 10 μm (product name: Naslon NF06D produced by Nippon Seisen Co., Ltd.) was installed in the extruders A, M and B in place of a sintered metal filter having a filtration accuracy of 40 μm, and the extrusion outputs of the extruders A, M and B were set to 1.6 kg/hr, 3.1 kg/hr and 1.6 kg/hr, respectively, and the rotation rate of the chill-roll was set to 2 m/min.

Comparative Example 13

A polypropylene resin composition and a polypropylene film were prepared and evaluated as in Comparative Example 12 except that the extrusion outputs of the extruders A, M and B were set to 3.5 kg/hr, 7 kg/hr and 3.5 kg/hr, respectively, and the rotation rate of the chill-roll was set to 4 m/min.

Comparative Example 14

A polypropylene resin composition and a polypropylene film were prepared and evaluated as in Comparative Example 12 except that the extrusion outputs of the extruders A, M and B were set to 17 kg/hr, 31 kg/hr and 16 kg/hr, respectively, and the rotation rate of the chill-roll was set to 35 m/min.

Comparative Example 15

A polypropylene resin composition and a polypropylene film were prepared and evaluated as in Comparative Example 12 except that the extrusion outputs of the extruders A, M and B were set to 32 kg/hr, 48 kg/hr and 30 kg/hr, respectively, and the rotation rate of the chill-roll was set to 60 m/min.

Conditions and results of Examples 4 to 11 and Comparative Examples 6 to 15 are shown in Table 2.

TABLE 2

| | Raw Materials | | | | Intrinsic | | | | | |
| | Ingredient (A) | | Ingredient (B) | | Viscosity | | Filtration Rate (cm/min) | | | |
| | Intrinsic Viscosity (dl/g) | Ratio (wt %) | Intrinsic Viscosity (dl/g) | Ratio (wt %) | of Mixed Fluid (dl/g) | Filtration Accuracy (μm) | Extruders A and B | Extruder M | Seal at Edge | Number of Fisheyes (/225 cm²) |
|---|---|---|---|---|---|---|---|---|---|---|
| Ex. 4 | 3.3 | 21 | 1.7 | 79 | 2.12 | 40 | 3.5 | 3.6 | Sealed | 5 |
| Ex. 5 | | | | | | | 14 | 15 | Sealed | 17 |
| Com. Ex. 6 | | | | | | 60 | 59 | 194 | Sealed | 40 |
| Com. Ex. 7 | | | | | | | 3.5 | 3.6 | Sealed | 47 |
| Com. Ex. 8 | | | | | | | 3.5 | 3.6 | Sealed | 74 |
| Com. Ex. 9 | | | | | | 100 | 3.5 | 3.6 | Sealed | 140 |
| Com. Ex. 10 | | | | | | | 14 | 15 | Sealed | 171 |
| Ex. 6 | 3.2 | 25 | 1.8 | 75 | 2.12 | 40 | 3.5 | 3.6 | Sealed | 11 |
| Ex. 7 | | | | | | | 14 | 15 | Sealed | 25 |
| Com. Ex. 11 | | | | | | | 28 | 29 | Sealed | 51 |
| Ex. 8 | 3.3 | 21 | 1.7 | 79 | 2.04 | 20 | 3.5 | 3.6 | Sealed | 0 |
| Ex. 9 | | | | | | | 14 | 20 | Sealed | 0 |
| Ex. 10 | | | | | | | 52 | 75 | Sealed | 2 |
| Ex. 11 | 3.0 | 35 | 1.6 | 65 | 2.09 | 20 | 14 | 15 | Sealed | 3 |
| Com. Ex. 12 | 7.9 | 11 | 1.14 | 89 | 1.88 | 10 | 1.0 | 1.1 | Sealed | 44 |
| Com. Ex. 13 | | | | | | | 2.4 | 3.5 | Sealed | 1120 |
| Com. Ex. 14 | | | | | | | 11 | 11 | Sealed | 10813 |
| Com. Ex. 15 | | | | | | | 21 | 18 | Sealed | 11223 |

Industrial Applicability

According to the present invention, a polyolefin resin composition in which dispersion of respective polyolefin ingredients is sufficiently good and homogeneous and a production process therefor can be provided. In addition, a polyolefin film in which the amount of fisheyes is sufficiently reduced obtained by using the polyolefin resin composition can be provided.

The invention claimed is:

1. A process for producing a polyolefin resin composition containing a polyolefin ingredient (A) having an intrinsic viscosity $[\eta]_A$ of 3 to 5 dl/g and a polyolefin ingredient (B) having an intrinsic viscosity $[\eta]_B$ of 0.5 to 3 dl/g with a ratio of intrinsic viscosity $[\eta]_A$ to intrinsic viscosity $[\eta]_B$ ($[\eta]_A/[\eta]_B$) being in a range of 1.5 to 10, wherein the process comprises:

a mixing step comprising melt-kneading a raw material composition which contains the polyolefin ingredient (A) and the polyolefin ingredient (B) to prepare a mixed fluid having a content of the polyolefin ingredient (A) of 0.05 to 35 mass % and a content of the polyolefin ingredient (B) of 99.5 to 65 mass % based on the total mass of the raw material composition, wherein the raw material composition is one obtained by a polymerization process comprising a step of producing the polyolefin ingredient (A) having an intrinsic viscosity of not less than 3 dl/g and a step of continuously producing the polyolefin ingredient (B) having an intrinsic viscosity of less than 3 dl/g, and the whole raw material composition has an intrinsic viscosity of less than 3 dl/g; and a filtering step comprising introducing the mixed fluid into a filter device having a main body section having a flow passage through which the mixed fluid is transferred and a sintered metal filter having a filtration accuracy of 1 to 40 μm and disposed in the flow passage of the main body section of the device and forcing the mixed fluid to pass through the sintered metal filter so that the filtration rate of the mixed fluid will be 0.001 to 20 cm/min, wherein the sintered metal filter is fixed to the main body section of the device while keeping a section where the edge of the sintered metal filter abuts with the main body section of the device hermetically sealed.

2. A process for producing a polyolefin resin composition containing a polyolefin ingredient (A) having an intrinsic viscosity $[\eta]_A$ of 3 to 5 dl/g and a polyolefin ingredient (B) having an intrinsic viscosity $[\eta]_B$ of 0.5 to 3 dl/g with a ratio of intrinsic viscosity $[\eta]_A$ and intrinsic viscosity $[\eta]_B$ ($[\eta]_A/[\eta]_B$) being in a range of 1.5 to 10, wherein the process comprises:

a mixing step comprising melt-kneading a raw material composition which contains the polyolefin ingredient (A) and the polyolefin ingredient (B) to prepare a mixed fluid having a content of the polyolefin ingredient (A) of 0.05 to 35 mass % and a content of the polyolefin ingredient (B) of 99.5 to 65 mass % based on the total mass of the raw material composition, wherein the raw material composition is one obtained by a polymerization process comprising a step of producing the polyolefin ingredient (A) having an intrinsic viscosity of not less than 3 dl/g and a step of continuously producing the polyolefin ingredient (B) having an intrinsic viscosity of less than 3 dl/g, and the whole raw material composition has an intrinsic viscosity of less than 3 dl/g; and a filtering step comprising introducing the mixed fluid into a filter device having a main body section having a flow passage through which the mixed fluid is transferred and a sintered metal filter having a filtration accuracy of 1 to 20 μm and disposed in the flow passage of the main body section of the device and forcing the mixed fluid to pass through the sintered metal filter so that the filtration rate of the mixed fluid will be 0.001 to 100 cm/min, wherein the sintered metal filter is fixed to the main body section of the device while keeping a section where the edge of the sintered metal filter abuts with the main body section of the device hermetically sealed.

3. A process for producing a polyolefin resin composition containing a polyolefin ingredient (A) having an intrinsic viscosity $[\eta]_A$ of 5 to 15 dl/g and a polyolefin ingredient (B) having an intrinsic viscosity $[\eta]_B$ of 0.5 to 3 dl/g, wherein the process comprises:

a mixing step comprising melt-kneading a raw material composition which contains the polyolefin ingredient (A) and the polyolefin ingredient (B) to prepare a mixed fluid having a content of the polyolefin ingredient (A) of 0.05 to 35 mass % and a content of the polyolefin ingredient (B) of 99.5 to 65 mass % based on the total mass of the raw material composition;

wherein the raw material composition is one obtained by a polymerization process comprising a step of producing the polyolefin ingredient (A) having an intrinsic viscosity of not less than 5 dl/g and a step of continuously ingredient (B) having an intrinsic viscosity of less than 3 dl/g, and the whole raw material composition has an intrinsic viscosity of less than 3 dl/g; and a filtering step comprising introducing the mixed fluid into a filter device having a main body section having a flow passage through which the mixed fluid is transferred and a sintered metal filter having a filtration accuracy of 1 to 10 μm and disposed in the flow passage of the main body section of the device and forcing the mixed fluid to pass through the sintered metal filter so that the filtration rate of the mixed fluid will be 0.001 to 0.2 cm/min, wherein the sintered metal filter is fixed to the main body section of the device while keeping a section where the edge of the sintered metal filter abuts with the main body section of the device hermetically sealed.

4. The production process according to claim 1, wherein the filter device has a leaf disk type filter formed of a plurality of the sintered metal filters.

5. The production process according to claim 2, wherein the filter device has a leaf disk type filter formed of a plurality of the sintered metal filters.

6. The production process according to claim 3, wherein the filter device has a leaf disk type filter formed of a plurality of the sintered metal filters.

* * * * *